Sept. 28, 1926.
L. G. MERRITT ET AL
DIFFERENTIAL CONVEYER
Filed Jan. 17, 1925   5 Sheets-Sheet 4
1,601,316
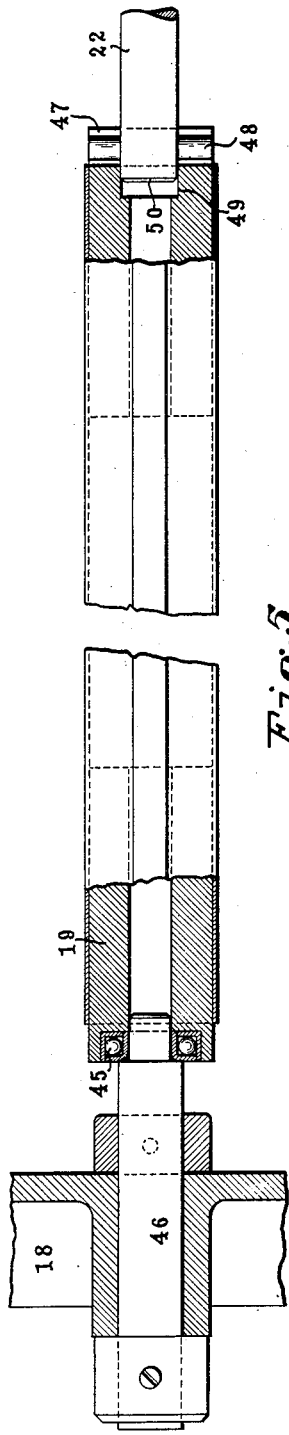
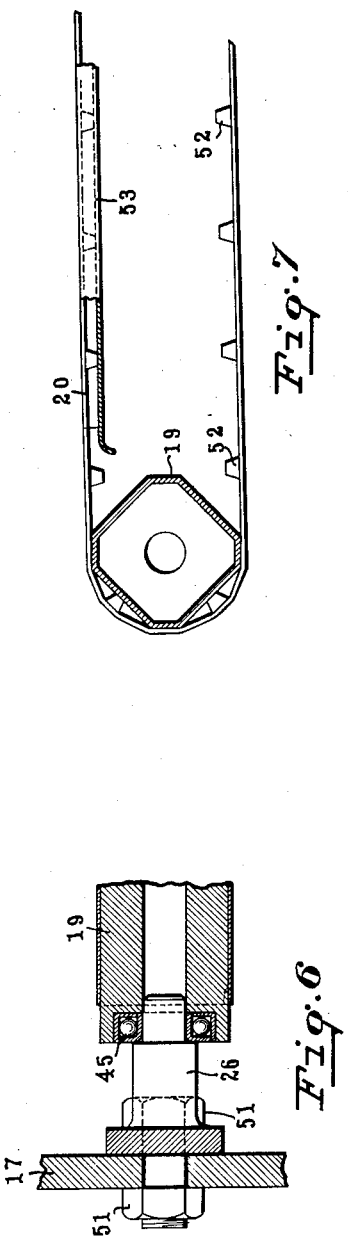
INVENTORS
Louis G. Merritt,
Kenneth E. Berray
and
Richard W. Stanley
BY Mayer, Warfield and Watson
ATTORNEY

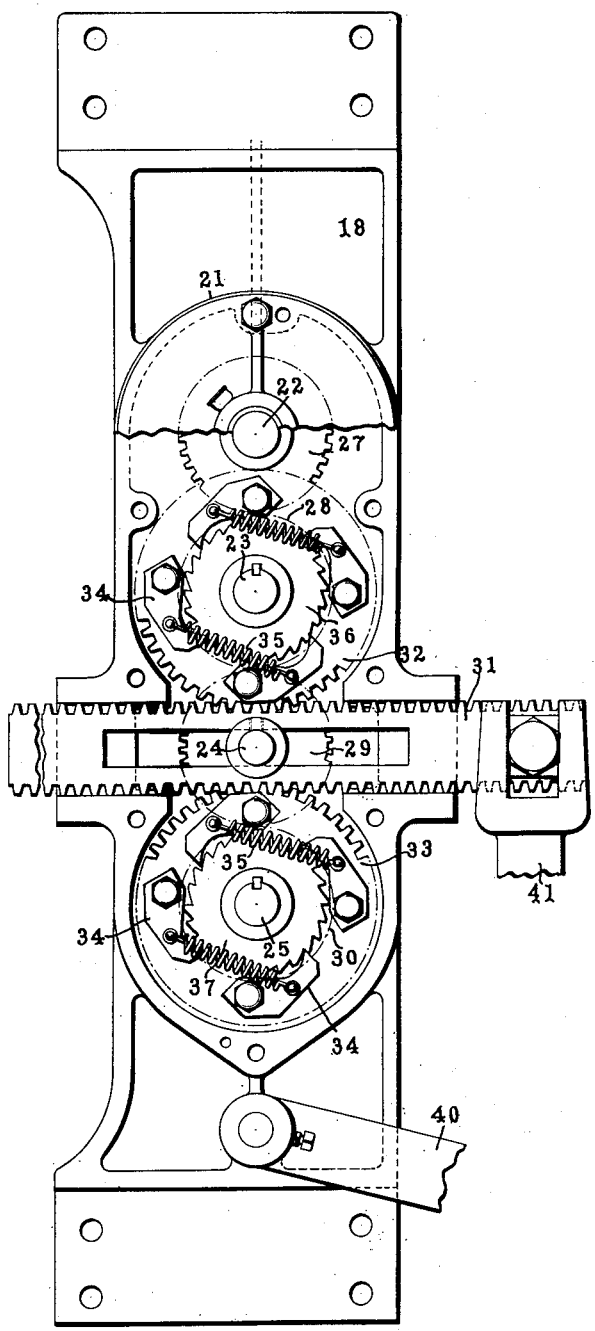
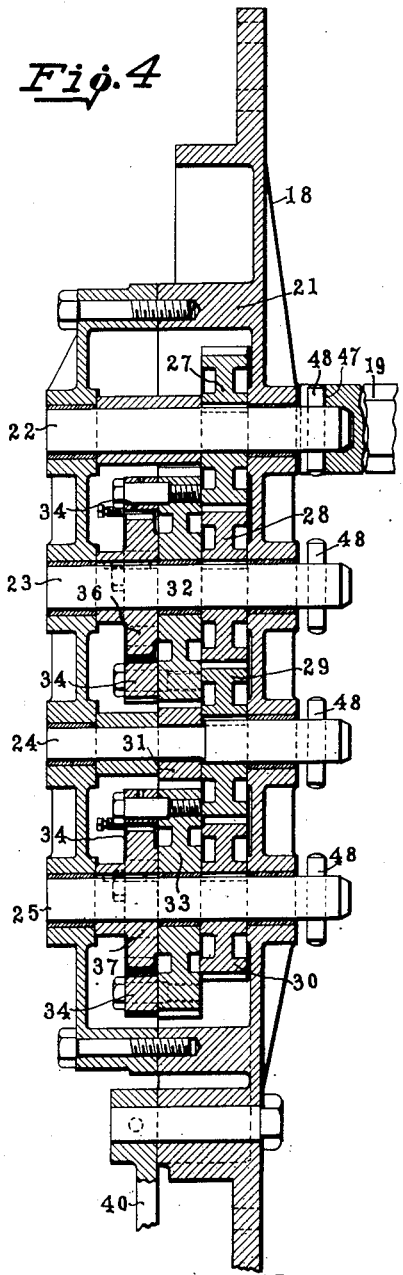
Fig.4
Fig.3

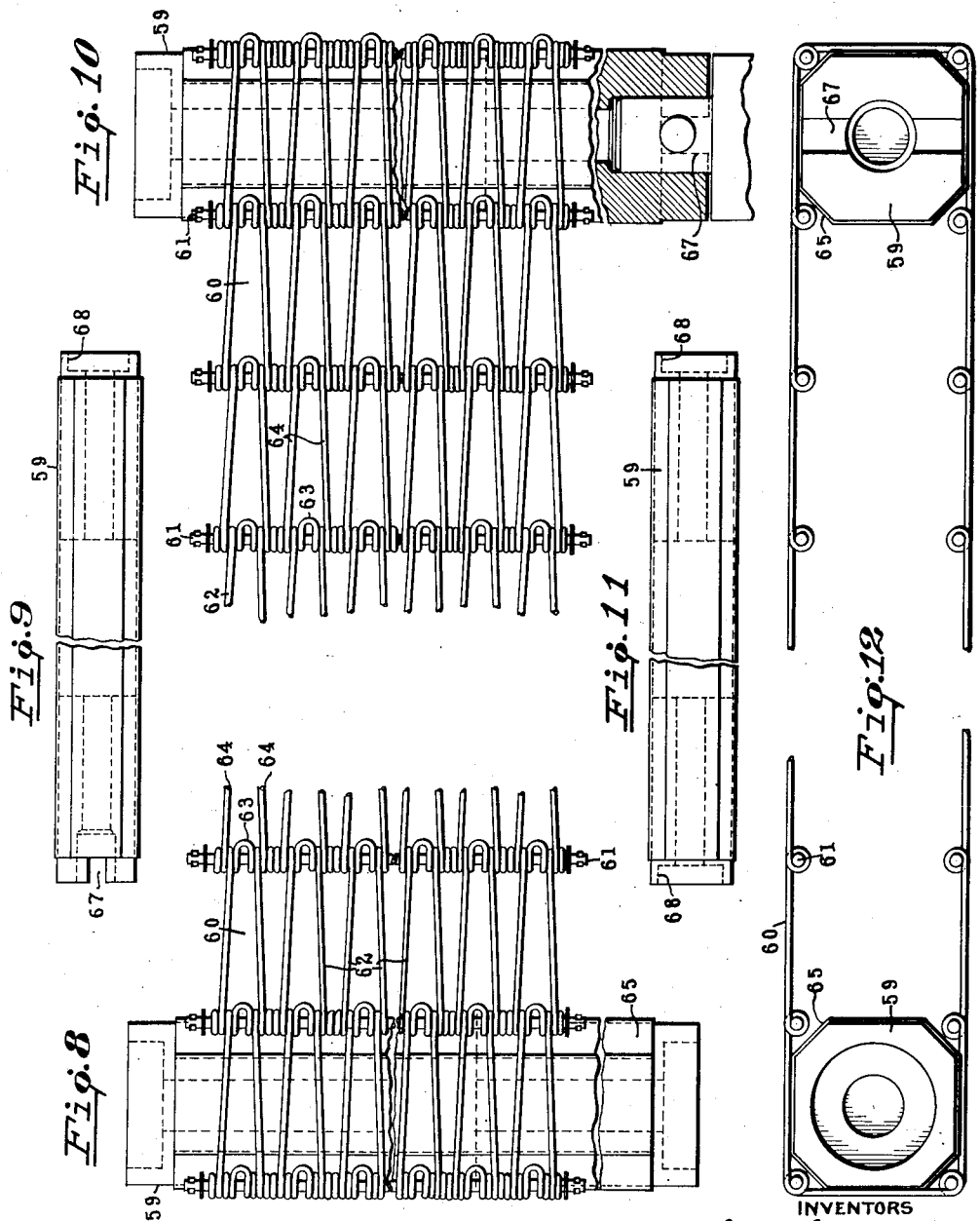

Patented Sept. 28, 1926.

1,601,316

UNITED STATES PATENT OFFICE.

LOUIS G. MERRITT, KENNETH E. BERRAY, AND RICHARD W. STANLEY, OF LOCKPORT, NEW YORK, ASSIGNORS TO MERRITT ENGINEERING & SALES COMPANY, INC., OF LOCKPORT, NEW YORK, A CORPORATION OF NEW YORK.

DIFFERENTIAL CONVEYER.

Application filed January 17, 1925. Serial No. 3,095.

This invention relates to differential conveyers, and more particularly to conveyer mechanisms arranged to feed a plurality of receivers at different velocities.

The invention has for its object generally to provide an improved construction and arrangement of parts which is efficient, economical and readily manufactured.

A more specific object of the invention is to provide a conveyer mechanism in which the motions of different parts of the conveyer are related in a predetermined ratio so that such parts feed with the different velocities desired.

Still another object is to provide a feed mechanism adapted for the intermittent feeding of sheet material to be dried at the required velocities between the hot plates or platens of a drier of the type disclosed in co-pending application Serial No. 741,592, filed October 4, 1924.

Other objects of the invention will in part be obvious and will in part appear hereinafter.

The invention accordingly comprises the features of construction, combinations of elements and arrangement of parts which will be exemplified in the construction hereinafter set forth, and the scope of the application of which will be indicated in the claims.

For a fuller understanding of the nature and objects of the invention reference should be had to the following detailed description taken in connection with the accompanying drawing, in which:

Figs. 3 and 4 are detailed views of the intermittent feed mechanism used to actuate the conveyers shown in Figs. 1 and 2;

Figs. 5, 6 and 7 are fragmentary views showing, respectively, various details in the construction of the conveyer; while Figs. 8 to 12 are similar fragmentary views showing details of an alternative form of conveyer construction.

In carrying out the present invention in order to have an endless conveyer adapted to feed with different resultant velocities at different points, the conveyer is mounted on a frame which has a motion of its own, the conveyer being so disposed on the frame that its upper and lower portions have components of motion parallel to the motion of the frame. Since the upper and lower portions of the conveyer move in opposite directions they may be referred to for convenience as positively and negatively moving portions. As a result, when the frame is moved the translation of one of these portions will be added geometrically to that of the frame so as to give one of the resultant motions; while the movement of the other portion will be likewise subtracted from the motion of the frame to give another. In the latter case, the resultant motion will be the differential of the two translations. By providing means for relating the respective motions of the frame and conveyer in a predetermined ratio, the sum and difference of the resultant motions can be made to have any desired values.

In a drying machine of the character disclosed in the co-pending application Serial No. 741,592 above referred to, there are a plurality of courses in which sheet material to be dried is treated, the same being fed between certain hot plates while it is being received from between certain others. This feeding is not, however, simultaneous, but occurs at cyclic intervals; the material is thus fed intermittently, the receiving taking place during the periods when the feeding has ceased. Machines of this character may be fed by hand, but where a machine of large capacity is provided automatic feeding is desirable, since the sheet material is thus received and fed regularly, irrespective of the immediate attention of the attendant. This feeding is, however, preferably accomplished by means of intermittently actuated conveyers of the belt type, but in order to adapt a belt conveyer for feeding sheet material to a drying machine of the kind above referred to, it is desirable that the different parts of the conveyer move with speeds timed to correspond with that of the courses in which the different sheets of the material treated move, i. e., while the upper portion of the belt conveyer is arranged to feed sheet material to one course in the machine, the lower portion, which is to guide the reception of sheet material from another course, is arranged to have substantially no motion at all. Thus it will be seen that, in a feed-mechanism designed for such service, it is desirable to provide a belt conveyer on a movable frame in which the ratio of the motions is made such that their differential is substantially zero.

Figure 1:
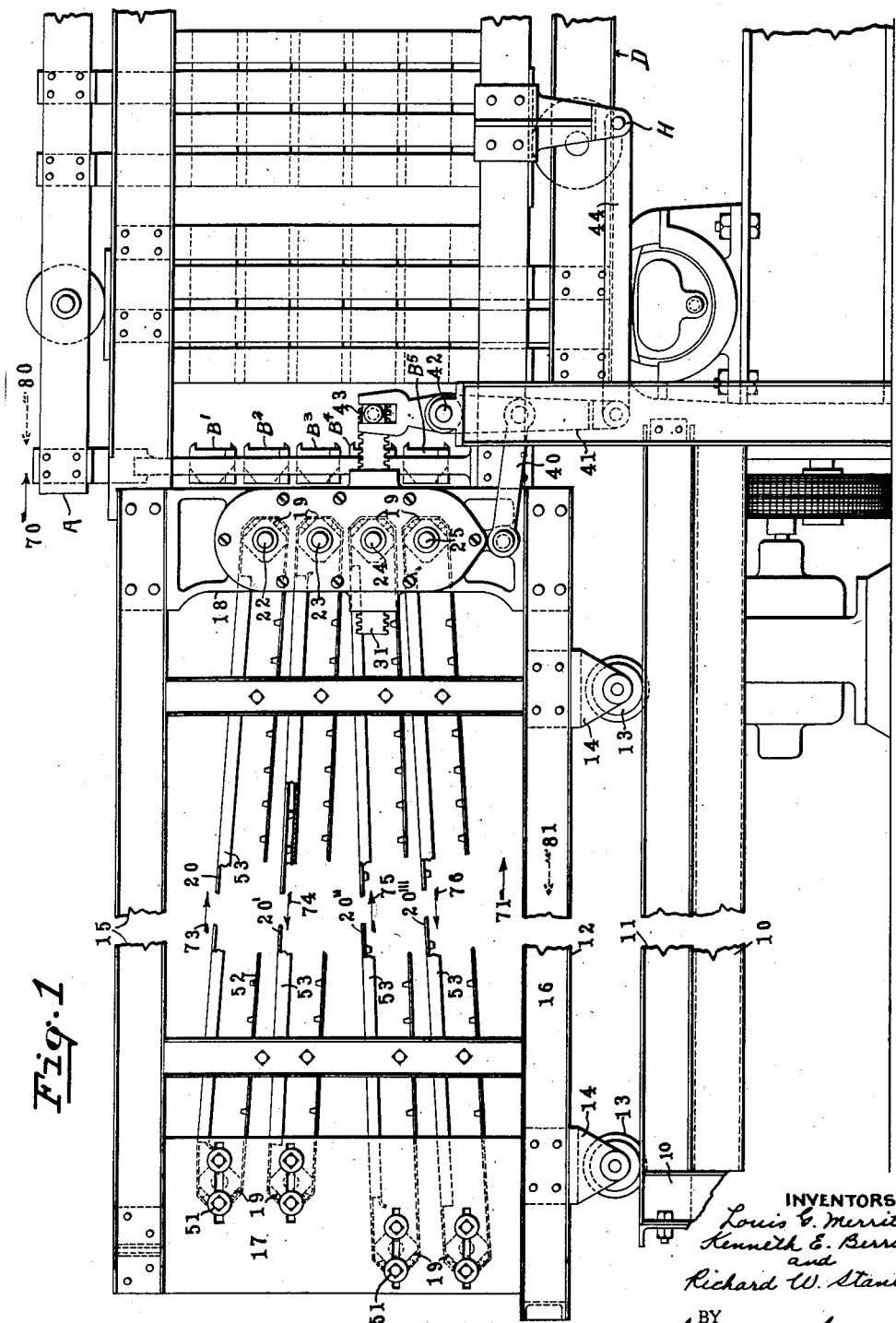
Fig. 1 is a side elevation, parts being broken away, showing a feed mechanism constructed in accordance with the invention, the mechanism being shown as arranged for feeding sheet material between the hot plates of a drier.
Figure 2:
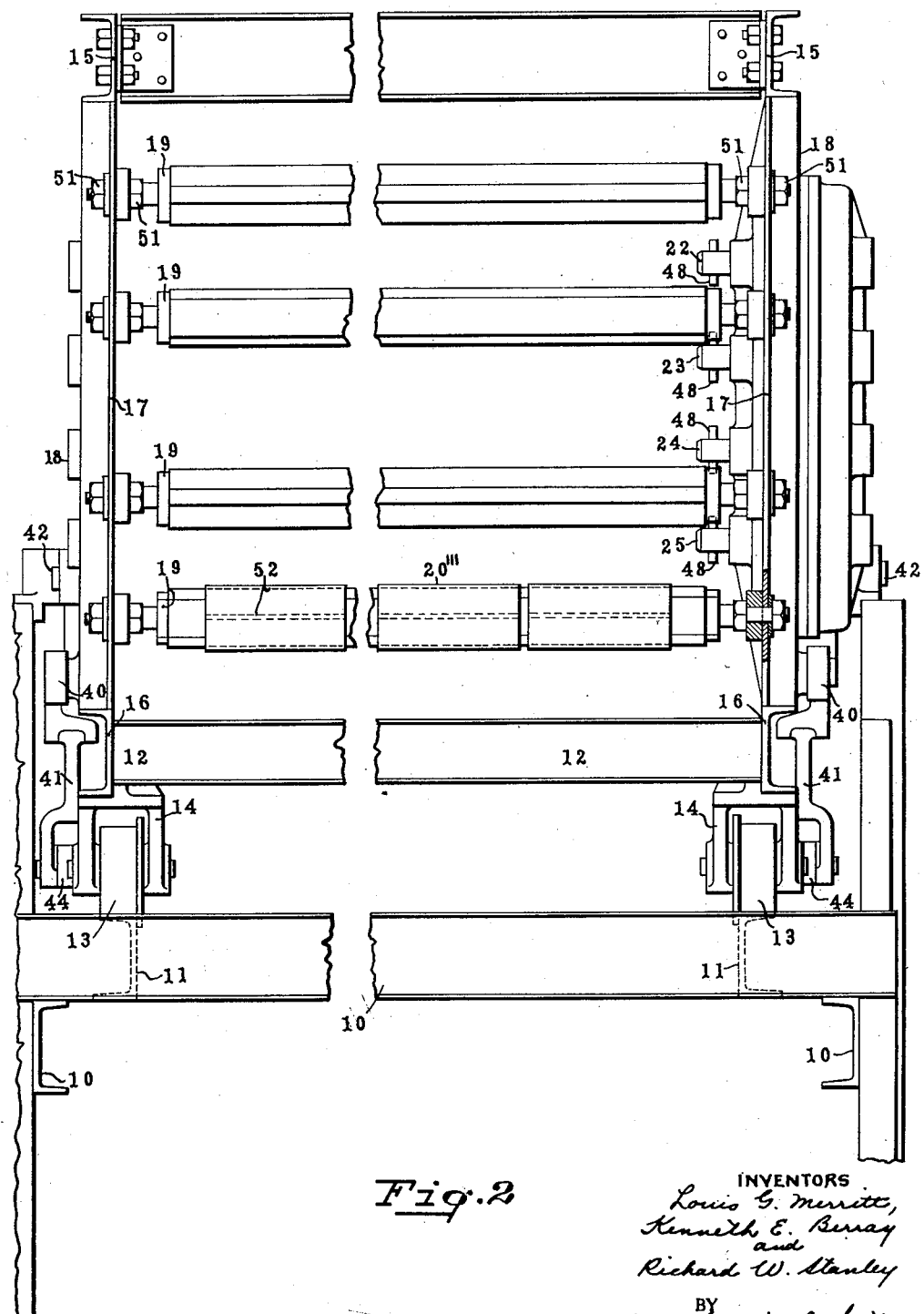
Fig. 2 is an end elevation, parts being broken away, showing the feed mechanism illustrated in Fig. 1.

In Figs. 1 and 2 there is shown a base 10 provided with longitudinally disposed beams or rails 11 adapted to provide a track on which the frame 12 is arranged to travel, the frame being provided with wheels 13 for this purpose, which are journaled in suitably attached brackets 14.

The frame 12 comprises upper and lower members 15 and 16, between which are disposed upright end members 17 and 18. These end members serve as supports for the revolving sprockets 19 which support and actuate the moving surfaces of the endless conveyers 20, 20', 20'', 20'''.

As shown in the drawing there are four such conveyers mounted on the frame 12 in superposed relation, the upper two conveyers being inclined slightly downwardly toward the machine, shown at the right, while the lower two are inclined slightly upwardly. These four conveyers are so positioned with respect to the end member 18 that sheet material disposed thereon is adapted to be fed into or received from the several openings between the platens of the drying machine, indicated generally at D. On the upright member 18 there is mounted the feed mechanism which actuates the sprockets 19. This mechanism as indicated, comprises a base 21, shown as part of the member 18, in which are journaled four shafts 22, 23, 24 and 25. These shafts are connected respectively with the cooperating projecting ends of the sprockets by means of a construction hereinafter specified. The shafts 22, 23, 24 and 25 have respectively secured thereon the train of intermeshing gears 27, 28, 29 and 30 arranged for simultaneous rotation, each shaft rotating in an opposite direction to the two adjacent shafts.

These shafts, as above indicated, are driven intermittently. In the present construction this is preferably accomplished by means of a pawl-and-ratchet mechanism. The mechanism here shown is double acting, inasmuch as it is arranged to actuate this train of gears in the same direction by both the forward and backward strokes of a reciprocating rack 31; the rack being shown as meshing with a pair of loosely mounted pinions 32 and 33, which are mounted to turn as idlers upon the shafts 23 and 25, respectively. These pinions carry dogs or pawls 34, which are retained in place by means of the springs 35. These pawls engage with the ratchet-wheels 36 and 37 which are secured on the shafts 23 and 25, respectively. Since these shafts carry the gears 28 and 30, which mesh with the intervening gear 29, they necessarily rotate in the same direction; consequently, the rack which rotates the pinions 32 and 33 in opposite directions is arranged so that it does not drive both the shafts 23 and 25 at the same time. This is preferably accomplished by similarly inclining the teeth on the ratchet-wheels 36 and 37, which drive the shafts 23 and 25, whereby they are engaged alternately by the pawls on the pinions 32 and 33 for each of the two halves of a complete oscillation of the pinions 32 and 33, which is produced by the reciprocation of the rack 31. A link 40 is shown as pivotally connected to the member 18 in order to impart movement to the frame 12.

Since the motions for feeding the drying machine D are recurrent and intermittent, the means correlating the motions of the frame and the conveyers is here shown as a lever 41, which is pivoted at 42 to an upright support, preferably forming a part of the base 10. The proportioning of the motions of the frame and of the pawl-actuated conveyer is accomplished by connecting the rack 31 and the link 40, respectively, to a proportioning device, such, for example, as the lever shown at 41.

The rack 31 is here shown as provided with a block 43 adapted to work in a slot formed in the upper end of the lever 41.

As pointed out above, the differential of the two motions when feeding the drying machine D is desired to be zero; consequently, the link 40 is connected to the lever 41 at a point such that the radius of motion from its pivotal connection to the pivot 42 is to the distance from the pivot 42 to the center of nut 43 as the gear ratio of the sprockets 19 to the pinion 33. As a result the frame 12 will have a translation of substantially the same magnitude as the translation imparted to the moving surface of the conveyers. In order that the lever 41 shall effect the motion of the frame 12 and the conveyers in proper synchronism with the feeding motions in the drying machine, the lower end of the lever 41 is connected by means of the link 44 to a suitable moving part of the machine, such, for example, as the depending hanger H on the traveling frame or member A.

As shown in Fig. 5, the sprockets 19 have a tubular form polygonal in cross-section, and are preferably provided with ball-bearings 45 adapted to engage with a stud 46 rigidly mounted in the end member 18. The sprockets at the feeding end of frame 12 have ball bearings in only one end, the other end being provided with a kerf 47, which is adapted to engage with and receive the pin 48 inserted for driving engagement in the shafts mounted in the base 21. For convenience of removal, the tubular sprockets at the feeding end of frame 12 are each formed with a counter-sunk recess 49 adapted to receive the projecting end 50 of one driving shaft. In this way the tubular sprocket is held securely in place and yet employs but one ball bearing, which also serves as a thrust bearing.

The tubular sprockets mounted in the other end of the frame are mounted in an adjustable manner so that play may be taken up to any desired extent. Accordingly, the tubular sprockets 19 are mounted on adjustable studs 26, movably secured in the end members 17 at each side of the frame 12. In Fig. 6 these studs are shown as secured in slots, the same being held in the slots by means of the locking nuts 51.

In Fig. 7 the sprocket 19 is shown in cross section, and has generally an octagonal shape, the adjacent sides being of different lengths in order to properly engage with the moving surface of the conveyers to effect their feeding. Each conveyer, as shown in Fig. 7, is also provided with extensions or ridges 52, which project from the surface which is adapted to engage with the sprocket surface. The polygonal form of the sprockets thus assists in producing frictional engagement between the conveyer and the sprocket 19, whereby substantially no slipping takes place. The frame 12 is also arranged to have secured thereto supporting surfaces 53, which extend from one side of the frame to the other underneath the upper portion of each of the belt conveyers. Each of these supporting surfaces, as shown in Fig. 7, is spaced sufficiently from the upper portion of the belt that ridges 52, disposed transversely thereon, will ride thereover without undue friction. As a consequence, the belt conveyers may carry relatively large weights of sheet material without sagging to any material extent.

In Figs. 8 to 12 there is shown an alternative form of belt conveyers, which is adapted to be mounted in the frame 12. Here tubular sprockets 59 (see Fig. 8) are provided, which are quite similar to those shown at 19, but have a chain type of continuous belt conveyer 60 disposed thereover. This chain type of belt conveyer comprises a linked mesh surface having a plurality of spaced transverse rods 61 secured together by a series of interconnected wire links 62, which are somewhat hairpin-shape in form, having the bent end 63 wrapped about a rod 61 and disposed between the coiled ends of legs 64 of an adjacent bent hairpin-link, which is similarly wrapped about the next adjacent rod 61. In this fashion a continuous wire net is provided, having a relatively strong, yet flexible, moving conveyer surface. The sprockets 59 likewise are generally octagonal in shape, as indicated in Fig. 12, but their disposition with respect to the articulated link portions of the chain type of belt conveyer is different. Both sides of the octagonal sprockets, as shown in Fig. 12, are arranged to provide support for the wire links 62. The short sides of the octagon, indicated generally at 65, provide the clearance for the rods 61 as the conveyer turns about the corners of the sprocket 59.

Fig. 9 shows in general elevation details of a sprocket 59. As here shown, it is provided with a kerf 67 adapted to cooperate with the driving shaft in the base 21. At the other end the tubular sprocket is recessed, as indicated at 68, to receive a ball bearing. Fig. 11 illustrates the type of tubular sprocket mounted in the end member 17. This sprocket also has recesses 68 at both ends to receive ball bearings.

The operation of the feeding mechanism here provided to feed the drying machine D is substantially as follows:

Let it be assumed that the feed bars $B^1$ and $B^2$ carried at the end of the traveling frame or member A have just closed to grip sheet material, for example, wood veneer, to be dried. This sheet material would be disposed on the upper surface of the top conveyer 20, and also on the upper surface of the third conveyer from the top, since the feed bars $B^3$ and $B^4$ are in substantially the same relation to each other as the feed bars $B^1$ and $B^2$. As the traveling member becomes displaced in the direction of the arrow shown at 70, motion is transmitted to the lever 41 through the link 44 which causes the frame 12 to travel in the same direction, that is, the direction indicated by the arrow 71. The motion of the lever 41, which moves the frame 12, also moves the rack 31 to cause a rotation of the sprockets 19 that feed the upper surface of the top conveyer in the direction indicated by the arrow 73. The lower surface of the top conveyer, and also the top surface of the conveyer 20′ which is next below, move in the opposite direction, that is, in the direction indicated by the arrow 74. Conveyer 20″, which is the third from the top, moves in the same direction as the top conveyer, the motion of its top surface being indicated by the arrow 75. Similarly, the lowermost conveyer moves in the direction of the conveyer 20′, the direction of its upper surface being indicated by the arrow 76.

In consequence, as the motion of the traveling member A is communicated through the lever 41 and link 40 to the frame 12, the motion of the sheet material on the upper surface of the topmost conveyer 20 with respect to the base 10 will be the resultant of the sum of the motions of the frame and of the upper surface of the conveyer, that is, the motions indicated by the arrows 71 and 73 are added to get the resultant feeding of the sheet material with respect to the base, which in this case has the same magnitude as the advance of the member A indicated by the arrow 70.

In like manner, during the translation of the frame 12 in the direction of the arrow 71, the feeding of the sheet material resting on the conveyer the second from the top will be the difference between the motions indicated by the arrows 71 and 74. Since these motions are of substantially the same magnitude, their differential is zero, that is, the sheet material resting on the upper surface of the second conveyer from the top will have substantially no motion with respect to the base 10 when the frame 12 is traveling in the direction of the arrow indicated at 71.

As the motions of the third and fourth conveyers are substantially the same as the motion of the first and second conveyers respectively, it is seen that during the advance of the frame 12 in the direction of the arrow 71 the sheet material on the third conveyer will be fed in, with respect to the base, so as to have a displacement substantially the same as that of the member A, while that of the lowermost conveyer will be substantially at rest with respect to the base 10.

When the translation of the member A in the direction of the arrow 70 has been completed, the feed bars B¹—B², B³—B⁴ will be opened to release the sheet material; the feed bars B²—B³, B⁴—B⁵ will at the same time close to grip the sheet material which remained stationary with respect to the base during the preceding translation.

Let us assume now that the feed bars B²—B³, B⁴—B⁵ have gripped sheet material between them, and that the member A begins its translations in the direction indicated by the broken arrow at 80. The member A will communicate motion through the lever 41 to the frame 12 in the direction of the broken arrow 81. The rack 31 will be displaced in consequence in the opposite direction, but, owing to the arrangements of the pawls to the ratchet-wheels the feeding of the conveyers will continue in the same direction; the feed drive, however, is communicated through the alternative drive shaft, since only one of the drive shafts 23 and 25 drives at a time. When the frame 12 is traveling in the direction of the broken arrow 81 the resultant motion of the sheet material on the top surface of the top conveyer will be the difference between that indicated by the arrow 73 and that of the arrow 81. The displacement in the direction of the arrow 81 is, of course, substantially the same as that indicated at 71, but in the opposite direction, so that the resultant motion with respect to the base is zero. The feed motion imparted to the sheet material resting on the upper surface of the conveyer second from the top during this portion of the cycle is the sum of the motions indicated by the arrows 74 and 81. This translation has substantially the magnitude of the translation imparted to the member A, so that during this second half-cycle the sheet material gripped between the feed bars B²—B³, B⁴—B⁵ is received and carried from the drying machine at substantially the same rate as it is being fed through its course in the drying machine.

It is accordingly seen that by reciprocating the frame 12 which carries the intermittently actuated conveyers, and by properly proportioning the two motions, any desired feed velocities from the upper and lower portions of the conveyer may be had. For feeding the drying machine D it is seen that an intermittent feed desired for advancing the sheet material first in one direction, then in another, during the second half of the cycle is thus provided. Different sheets of material may be thus advanced in two opposite directions, each sheet receiving intermittently a resultant progressive advance in the same direction.

Since certain changes may be made in the above construction, and different embodiments of the invention could be made, without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having described our invention, what we claim as new and desire to secure by Letters Patent is:

1. A differential feed mechanism, comprising a base, a frame movable thereon, an endless conveyer mounted on said frame and provided with positively- and negatively-traveling portions having components arranged to move substantially parallel to the motion of said frame, and means for relating the motions of said conveyer and frame in a predetermined ratio whereby said traveling portions feed with different resultant velocities with respect to said base.

2. A differential feed mechanism, comprising a base, a frame movable thereon, an endless conveyer mounted on said frame and provided with positively- and negatively-traveling portions having components arranged to move substantially parallel to the motion of said frame, and a lever device having lever arms arranged respectively to move said conveyer and frame, said lever arms being proportioned in length to have a ratio whereby said traveling portions are made to feed with different resultant velocities with respect to said base.

3. A differential feed mechanism, comprising a base, a frame movable thereon, an endless conveyer mounted on said frame and provided with positively- and negatively-traveling portions having components arranged to move substantially parallel to the motion of said frame, and a power-actuating lever having one arm connected to actuate said conveyer and another arm connected to actuate said frame, said arms being proportioned in a predetermined ratio whereby the traveling portions of said conveyer move with different resultant velocities with respect to said base.

4. A differential feed mechanism, comprising a base, a frame movable thereon, an endless conveyer mounted on said frame and provided with positively- and negatively-traveling portions having components arranged to move substantially parallel to the motion of said frame, and a power-actuated lever having one arm connected to actuate said conveyer and another arm connected to actuate said frame, said arms being proportioned in such ratio that the differential of the velocities with which said traveling portions and frame move is substantially zero.

5. A differential feed mechanism adapted to feed sheet material to a drying machine, having a plurality of stationary and traveling drying plates for progressively treating said material comprising a base, a frame movable thereon, a plurality of conveyers mounted on said frame and arranged to have motion for feeding and receiving sheet material respectively from predetermined drying plates in said machine, said conveyers being of the endless belt type and having positively- and negatively-traveling portions arranged to have components moving substantially parallel to the motion of said frame, a power-actuating means for intermittently moving said conveyers, a second power-actuating means for reciprocating said frame, and means for mechanically relating said power-actuating means so that the relative motions of said frame and conveyer have a predetermined ratio.

6. A differential feed mechanism adapted to feed sheet material to drying machines, having a plurality of stationary and traveling drying plates for progressively treating said material, comprising a base, a frame movable thereon and a plurality of conveyers mounted on said frame and arranged to have motion for feeding and receiving sheet material respectively from predetermined drying plates in said machine, said conveyers being of the endless belt type and having positively- and negatively-traveling portions arranged to have components moving substantially parallel to the motion of said frame, power-transmitting means connected to move said frame and conveyers respectively, and a lever device having lever arms for interconnecting said power-transmitting means, said lever arms being proportioned so that the relative motions of said frame and conveyer have a predetermined ratio.

7. A differential feed mechanism adapted to feed sheet material to drying machines, having a plurality of stationary and traveling drying plates for progressively treating said material, comprising a base, a frame movable thereon, and a plurality of conveyers mounted on said frame and arranged to have motions for feeding and receiving sheet material respectively from predetermined drying plates in said machine, said conveyers being of the endless belt type and having positively- and negatively-traveling portions arranged with components moving substantially parallel to the motion of said frame, power-transmitting means connected for reciprocating said frame and for moving said conveyers respectively, and a lever device having lever arms for interconnecting said power-actuating means, said lever arms having lengths relatively proportioned so that the differential of the motions imparted to said frame and conveyers is substantially zero.

8. In combination, a drying machine having stationary and traveling members provided with spaced interleaved platens arranged for the progressive treatment of sheet material, a frame disposed adjacent an end of said traveling member, a base on which said frame is adapted to be reciprocated with a to-and-fro movement, a plurality of endless conveyers mounted on said frame and having positively- and negatively-moving portions, means for actuating said conveyers intermittently in the same direction with each reciprocation of said frame, and mechanical means connected to be actuated by the movement of said traveling member and arranged to impart motion respectively to said frame and to said conveyers in a predetermined ratio.

9. In combination, a drying machine having stationary and traveling members provided with spaced interleaved platens arranged for the progressive treatment of sheet materials, a frame disposed adjacent an end of said traveling member, a base on which said frame is adapted to be reciprocated with a to-and-fro movement, a plurality of endless conveyers mounted on said frame and having positively-and negatively-moving portions, means for actuating said conveyers intermittently in the same direction with each reciprocation of said frame, and a lever stationarily mounted with respect to said base, having its power arm connected to be actuated by the travel of said traveling member and having working arms connected respectively to actuate said frame and said conveyers, said working arms having lengths arranged to impart relative motions to said frame and conveyers in a predetermined ratio.

10. In combination, a drying machine having stationary and traveling members provided with spaced interleaved platens arranged for the progressive treatment of sheet materials, a frame disposed adjacent an end of said traveling member, a base on which said frame is adapted to be reciprocated with a to-and fro movement, a plurality of endless conveyers mounted on said frame and having positively- and negatively-moving portions, means for actuating said conveyers intermittently in the same direction with each reciprocation of said frame, and a support rigidly secured to said base, a pivoted lever mounted on said support, said lever having a power arm connected to be actuated by said traveling member, and a pair of working arms connected respectively to actuate said frame and said conveyers, said working arms being of such lengths that the reciprocating motion of said frame and the intermittent advance of the positively- and negatively-moving portions of said conveyers shall have a predetermined ratio.

11. In combination, a drying machine having a stationary and a traveling member provided with spaced interleaved platens arranged for the progressive treatment of sheet material, a frame disposed adjacent an end of said traveling member, a base on which said frame is adapted to be reciprocated, a plurality of endless conveyers mounted on said frame and having positively- and negatively-moving portions, means for actuating said conveyers intermittently in the same direction during the movements of said frame, a lever pivotally secured to said base, means connected therewith for moving the same, and a pair of working arms connected respectively to actuate said frame and said conveyers, said working arms being of such lengths that the differential between the reciprocating motion of said frame and the advance of said conveyer shall be substantially zero.

12. A device of the character described, including a movable frame, a plurality of conveyers movably mounted upon said frame, sprockets on said frame for actuating said conveyers, adjacent sprockets being arranged to rotate in relatively opposite directions, a train of gearing arranged to actuate said sprockets simultaneously, a reciprocable rack provided with a pawl mechanism for actuating said gear train intermittently in the same direction, and a pivoted lever having an arm connected to a source of power and a working arm connected to move said frame, said lever having a second working arm connected to actuate said rack, said working arms having their lengths proportioned so that the relation of the movement of said frame to the travel of said conveyers shall be in a predetermined ratio.

13. A device of the character described, including a movable frame, a plurality of conveyers of the endless type mounted in superposed relation on said frame and having positively- and negatively-moving portions, sprockets on said frame for actuating said conveyers, adjacent sprockets being arranged to rotate in relatively opposite directions, a train of gearing arranged to actuate said sprockets simultaneously, a reciprocable rack provided with a pawl mechanism for actuating said gear train intermittently in the same direction with each frame movement, and a pivoted lever having its power arm connected to be actuated by a source of power and a working arm connected to reciprocate said frame, said lever having a second working arm connected to actuate said rack, the lengths of said working arms being proportioned so that the differential between the length traversed by a reciprocation of said frame and the motion traversed by said conveyer for each displacement of said rack shall be substantially zero.

14. In a drying machine, the combination with means for feeding sheet material progressively but intermittently in relatively opposite directions, the feeding in one direction being arranged to take place during the intervals between feeding movements in the opposite direction, said means including elements for drying said sheet material during the feeding movements, of a conveyer mechanism having one part arranged for conveying sheet material in one direction into said machine, and another part arranged to receive sheet material discharged from said machine in the other direction, and an actuating device for automatically moving said conveyer mechanism so as to feed sheet material into said machine only during the interval of the feeding in one direction and to receive sheet material therefrom only during the interval of the feeding in the opposite direction.

15. In veneer-drying apparatus, in combination, means whereby one material is fed intermittently in one direction and other material is fed intermittently in the other direction, the intervals of feed in each case corresponding to the intervals of rest in the other, mechanism to dry said materials during their feed, material-conveying apparatus including parts to supply said one material into said means and parts to receive said other material discharged from said means, and mechanism whereby said means and said apparatus coact to effect supply to said means only during an interval of inaction of the latter on said one material, and to effect reception from said means only during an interval of inaction of the latter on said other material.

16. In a drying machine, the combination with means for feeding sheet material progressively but intermittently in relatively opposite directions, the feeding in one direction being arranged to take place during the intervals between feeding movements in the opposite direction, said means including elements for drying said sheet material during the feeding movements, of a conveyer mechanism having one part arranged for conveying sheet material in one direction into said machine and another part arranged to receive sheet material discharged from said machine in the other direction, and/an actuating device for positively driving said conveyer mechanism, said device being arranged to intermittently move one portion of said conveyer mechanism while retaining another portion substantially fixed with respect to a fixed part of said drying machine.

17. In a drying machine, the combination with means for feeding sheet material progressively but intermittently in relatively opposite directions, the feeding in one direction being arranged to take place during the intervals between feeding movements in the opposite direction, said means including elements for drying said sheet material during the feeding movements, of a conveyer mechanism having one part arranged for conveying sheet material in one direction into said machine and another part arranged to receive sheet material discharged from said machine in the other direction, and an actuating device for moving the portion of said conveyer mechanism which operates during a feeding movement while retaining another portion of said conveyer mechanism substantially at rest, said actuating device being arranged to move the other portion of said feeding mechanism during a receiving movement when the first portion remains at rest.

18. In a drying machine, the combination with means for feeding sheet material progressively but intermittently in relatively opposite directions, the feeding in one direction being arranged to take place during the intervals between feeding movements in the opposite direction, said means including elements for drying said sheet material during the feeding movements, of a conveyer mechanism having one part arranged for conveying sheet material in one direction into said machine and another part arranged to receive sheet material discharged from said machine in the other direction, and an actuating device for automatically operating said conveyer mechanism to feed sheet material intermittently and to remove other sheet material from said drying mechanism during the period of rest between feedings.

19. A device of the character described, including, in combination, means for intermittently advancing and acting upon material to be treated, and means for intermittently and positively feeding material to be treated towards said first-named means.

20. A device of the character described, including, in combination, means for intermittently advancing and acting upon material to be treated, and means for intermittently and positively feeding material to be treated towards said first-named means, one of said means acting during the period of inaction of the other.

21. A device of the character described, including, in combination, means for intermittently advancing and acting upon material to be treated, and means for intermittently and positively removing treated material from said first-named means.

22. A device of the character described, including, in combination, means for intermittently advancing and acting upon material to be treated, and means for intermittently and positively removing treated material from said first-named means, one of said means acting during the period of inaction of the other.

23. A device of the character described, including, in combination, means for intermittently and alternately feeding and treating two groups of material moving in different directions, and means alternately acting upon both of said groups for removing material from one and adding material to the other.

24. A device of the character described, including, in combination, means for intermittently and alternately feeding and treating two groups of material moving in different directions, and means alternately acting upon both of said groups during the period of non-treatment of the same for removing material from one and adding material to the other.

25. In combination, a veneer drier, and a feeding mechanism arranged adjacent thereto, said mechanism including means for automatically feeding material towards and away from said drier.

26. In combination, a veneer drier, and a feeding mechanism arranged adjacent thereto, said mechanism including means for feeding material towards and away from said drier so that the material fed in one direction remains substantially stationary relative to said drier during the movement of other material in an opposite direction.

27. In combination, a veneer drier, and a feeding mechanism arranged adjacent thereto, said mechanism including means for supporting material to be moved away from and towards a drier, and means whereby said material-supporting means is operated to retain certain of said material substantially immovable while moving other of said material.

28. A device of the character described, including a conveyer adapted to support material which is to be fed towards and away from a given point, and means whereby said conveyer moves certain of said material while retaining other material substantially fixed with respect to said given point.

29. A device of the character described, including an endless conveyer adapted to support material which is to be fed towards and away from a given point, and means whereby said conveyer moves certain of said material while retaining other material substantially fixed with respect to said given point.

30. The combination with a mechanism for operating upon material including means for intermittently and alternately moving two groups of material in opposite directions, of means for delivering additional material to said mechanism, and removing therefrom the material which has been operated upon.

31. The combination with a mechanism for operating upon material including means for intermittently and alternately moving two groups of material in opposite directions, of means for automatically delivering additional material to said mechanism, and removing therefrom the material which has been operated upon.

32. The combination with a mechanism for operating upon material including means for intermittently and alternately moving two groups of material in opposite directions, of means for delivering additional material to said mechanism, and removing therefrom the material which has been operated upon, and means for operating said last-named means to remove the treated material from said mechanism during the period of movement of the group from which the material is removed.

33. The combination with a mechanism for operating upon material including means for intermittently and alternately moving two groups of material in opposite directions, of means for delivering additional material to said mechanism, and removing therefrom the material which has been operated upon, means for operating said last-named means to remove the treated material from said mechanism during the period of movement of the group from which the material is removed, and means for interrupting the delivery of material to said mechanism during the said last-named operation.

34. In a feeding mechanism, the combination with a frame, of a traveling conveyer, said conveyer having a plurality of transverse ribs disposed on the under side of the conveyer surface, and a supporting plate on said frame disposed beneath the upper surface of the traveling conveyer and arranged for sliding contact with said ribs.

35. In a feeding mechanism, the combination with a frame, of a plurality of tubular sprockets rotatively mounted therein and adapted to support an endless conveyer, said sprockets having countersunk recesses at their ends, bearing members disposed in said recesses, and studs mounted on said frame cooperating with said bearing members to support said sprockets.

36. In a ratchet feed device, the combination with a plurality of intermeshing gears, each gear having a spindle, of pinions mounted on alternate spindles, and a rack disposed between said pinions and adapted to engage with the same, said pinions being provided with pawls and said spindles with ratchet wheels, the teeth on the different ratchet wheels being inclined in opposite directions whereby said intermeshing gears are actuated in the same direction with each stroke of said rack.

In testimony whereof we affix our signatures.

LOUIS G. MERRITT.
KENNETH E. BERRAY.
RICHARD W. STANLEY.